(12) United States Patent
Kwon et al.

(10) Patent No.: US 7,929,511 B2
(45) Date of Patent: Apr. 19, 2011

(54) METHOD AND APPARATUS FOR PRODUCING/RECOVERING OFDM/OFDMA SIGNALS

(75) Inventors: Yeong Hyeon Kwon, Gyeonggi-do (KR); Seung Hee Han, Seoul (KR); Min Seok Noh, Seoul (KR); Young Woo Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 12/092,555

(22) PCT Filed: Nov. 2, 2006

(86) PCT No.: PCT/KR2006/004536
§ 371 (c)(1),
(2), (4) Date: Oct. 6, 2008

(87) PCT Pub. No.: WO2007/052965
PCT Pub. Date: May 10, 2007

(65) Prior Publication Data
US 2009/0296564 A1    Dec. 3, 2009

(30) Foreign Application Priority Data

Nov. 3, 2005   (KR) .................. 10-2005-0105114

(51) Int. Cl.
*H04B 7/208* (2006.01)
(52) U.S. Cl. ........ 370/344; 370/208; 370/210; 370/281; 370/295; 370/319; 370/343; 370/480; 455/59; 375/260; 375/279; 375/308; 708/404

(58) Field of Classification Search .................. 370/208, 370/281, 295, 319, 343, 344, 480, 210; 455/59; 375/260, 279, 308; 708/404
See application file for complete search history.

(56) References Cited

U.S. PATENT DOCUMENTS
2003/0067866 A1   4/2003  Jung
(Continued)

FOREIGN PATENT DOCUMENTS
CN        1449166       10/2003
(Continued)

OTHER PUBLICATIONS

Dae-Woon Lim et al., "A PTS OFDM Scheme with Low Computational Complexity," International Symposium Proceedings on Information Theory, pp. 1141-1144, Sep. 2005.

(Continued)

*Primary Examiner* — Aung S Moe
*Assistant Examiner* — Hoon J Chung
(74) *Attorney, Agent, or Firm* — Lee, Hong, Degerman, Kang & Waimey (57) ABSTRACT

The present invention discloses a method of producing a multi-layered OFDM symbol using a plurality of small IFFT blocks. The produced OFDM symbol is able to reduce complexity in performing IFFT or FFT while maintaining orthogonality of a related art OFDM symbol. In particular, by avoiding the related art scheme using the N-sized IFFT, the layered IFFT is executed in a manner of grouping N data symbols into P groups each of which includes Q data symbols (N=P-Q). In order to produce an OFDM signal equal to that of the related art N-sized IFFT, it is preferable that phases are aligned for the data symbols on which Q-sized IFFT has been performed.

21 Claims, 6 Drawing Sheets

U.S. PATENT DOCUMENTS

| | | | | |
|---|---|---|---|---|
| 2003/0202460 | A1* | 10/2003 | Jung et al. | 370/208 |
| 2006/0002361 | A1* | 1/2006 | Webster et al. | 370/343 |
| 2006/0224651 | A1* | 10/2006 | Madhavapeddi et al. | 708/404 |
| 2006/0268675 | A1* | 11/2006 | Cho et al. | 370/210 |

FOREIGN PATENT DOCUMENTS

| | | |
|---|---|---|
| CN | 1522511 | 8/2004 |
| JP | 8-228186 | 9/1996 |
| JP | 2001-186104 | 7/2001 |

OTHER PUBLICATIONS

Dae-Woon Lim et al., "A New SLM OFDM Scheme With Low Complexity for PAPR Reduction," IEEE Signal Processing Letters, vol. 12, No. 2, pp. 93-96, Feb. 2005.

* cited by examiner

Count of PAPR scheme applications

FIG. 5

Count of sub-carriers allocated to user

METHOD AND APPARATUS FOR PRODUCING/RECOVERING OFDM/OFDMA SIGNALS

CROSS-REFERENCE TO RELATED APPLICATIONS

This application is a §371 filing of International Application Ser. No. PCT/KR2006/004536, filed Nov. 2, 2006, which claims the benefit of earlier filing date and right of priority to Korean Application No. 10-2005-0105114, filed on Nov. 3, 2005, the contents of all of which are incorporated by reference herein in their entirety.

TECHNICAL FIELD

The present invention relates to an orthogonal frequency division multiplexing communication system, and more particularly, to an apparatus for producing/recovering OFDM/OFDMA signals and method thereof.

BACKGROUND ART

Generally, an orthogonal frequency division multiplexing (hereinafter abbreviated OFDM) communication system is a sort of a communication scheme used by various systems (IEEE 802.11a/g, HiperLAN, IEEE 802.16, DSL, DAB, DVB, etc.). The OFDM scheme is very efficient for selective-fading of a communication channel. In the OFDM system, a plurality of sub-carriers are used, whereby the selective-fading is regarded as flat-fading. And, it is advantageous that a scheme for compensating for fading in an overall system becomes simplified.

To obtain the above features, an OFDM system introduces modulation/demodulation through FFT (Fast Fourier Transform) and IFFT (Inverse Fast Fourier Transform). Data to be transmitted is preferentially allocated to each sub-carrier. A signal in a time domain is then obtained by performing IFFT on the allocated data. A receiving end performs FFT on a received signal, estimates a channel through a pilot sub-carrier set in transmission, and then extracts data from the signal.

The OFDM system has had a problem that a peak power to average power ratio (PAPR) gets increased like a code division multiplexing access (CDMA) system. In particular, if a size of an OFDM symbol grows, this problem gets more serious. To correct the problem, various PAPR schemes have been proposed. Most of the PAPR schemes deal with the schemes by data manipulations in frequency domain. In the related art PAPR schemes, an optimal PAPR is found by repeating a process for manipulating data in frequency domain and checking PAPR in time domain. In this process, it is disadvantageous that complexity in producing a large OFDM symbol should be repeated each time.

The OFDM modulation scheme is able to employ multiple-users and its implementation is generally called OFDMA (OFDM multiple access) scheme. And, it is able to implement the OFDM modulation scheme by distributing sub-carrier within one large OFDM symbol to different users. Each of the different users should receive corresponding data by demodulating sub-carrier channels allocates to them, respectively. For this, a signal can be generally found by demodulating the large OFDM symbol entirely. This work having nothing to do with the number of sub-carriers distributed to the corresponding user wastes power of the corresponding user and needs hardware of high performance.

Figure 1A:
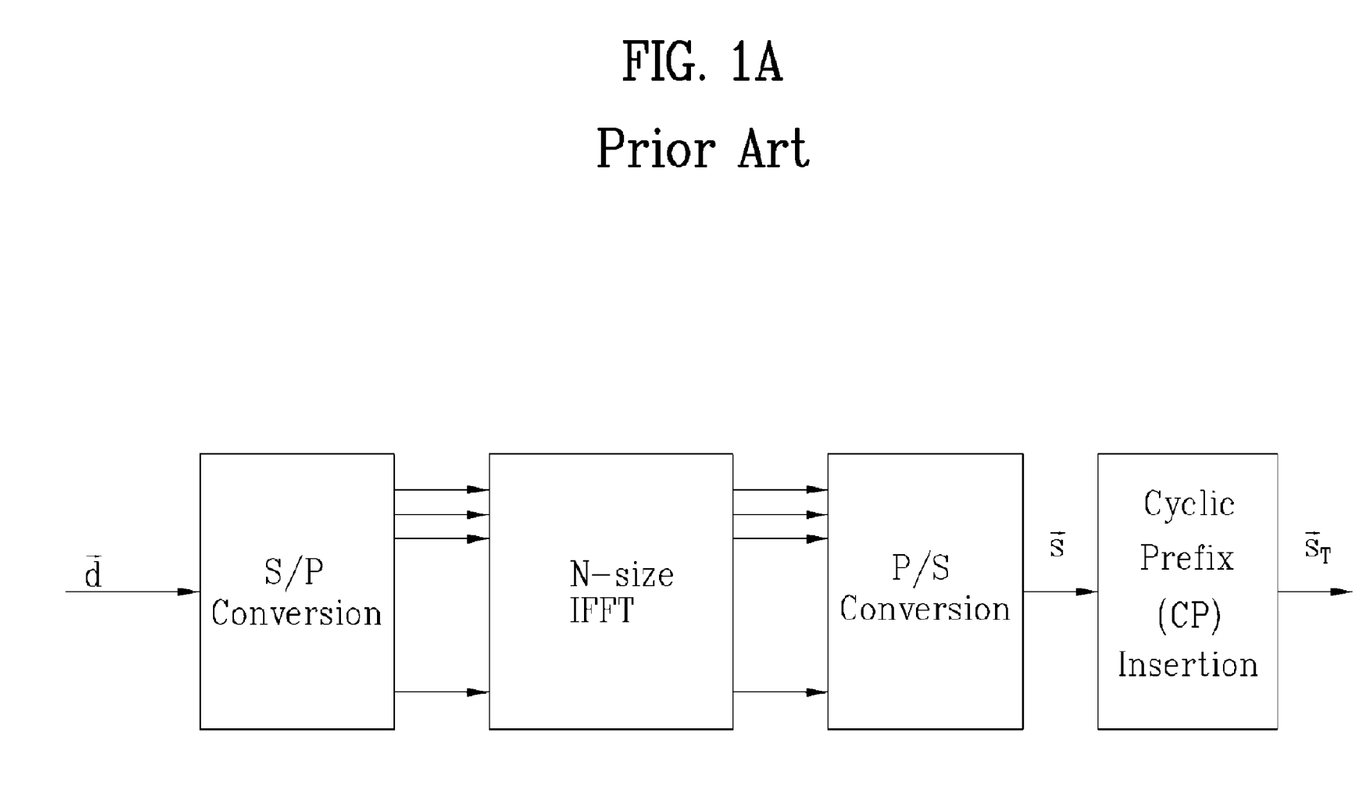
FIG. 1A is a diagram of a process for producing an OFDM signal in a transmitting side according to a related art.
Figure 1B:
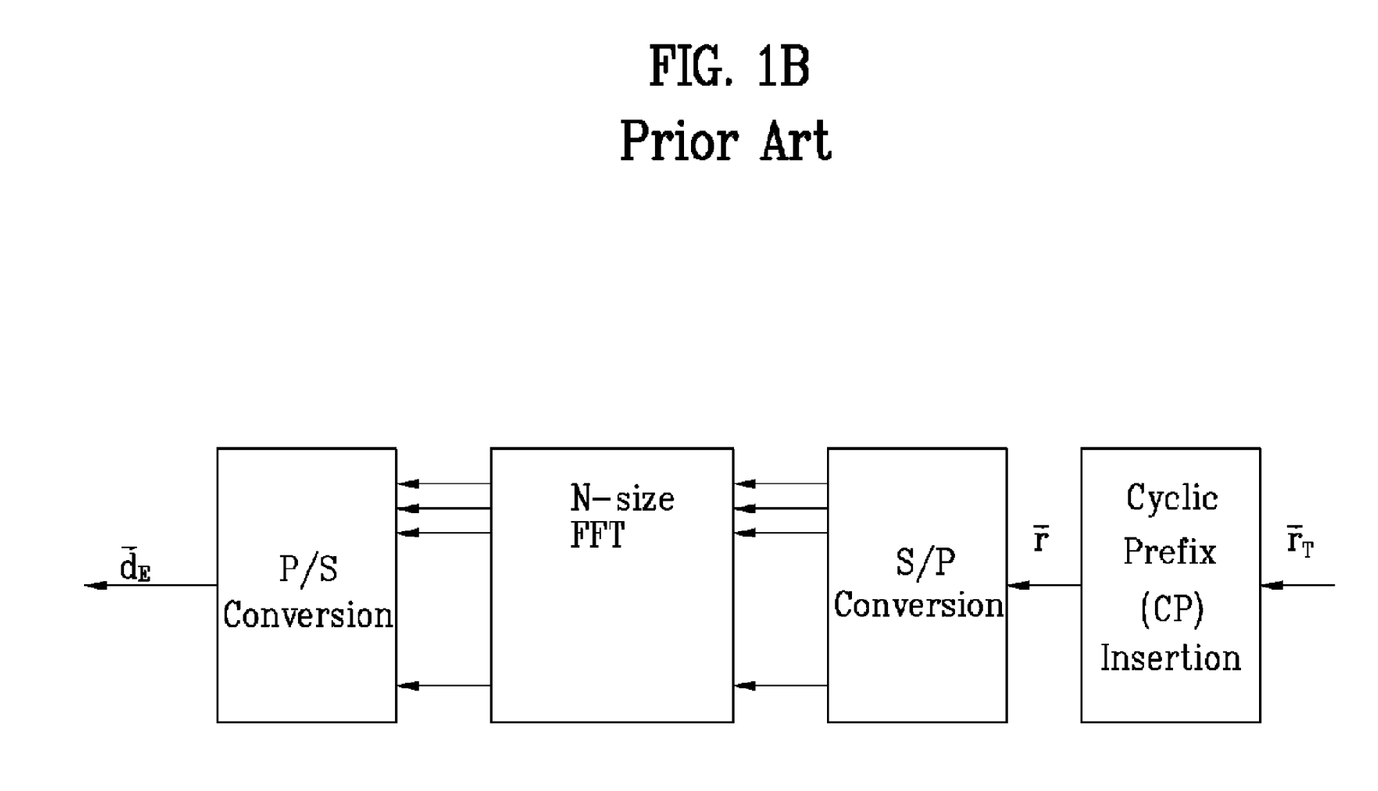
FIG. 1B is a diagram of a process for receiving and recovering an OFDM signal transmitted from a receiving side to a transmitting side.

FIG. 1A is a diagram of a process for producing an OFDM signal in a transmitting side according to a related art, and FIG. 1B is a diagram of a process for receiving and recovering an OFDM signal transmitted from a receiving side to a transmitting side.

Referring to FIG. 1A, after IFFT having a size of N (N-size) has been performed by converting input data symbol $\vec{d}=[d_0, d_1, \ldots, d_{N-1}]^T$ to serial-to-parallel (S/P), parallel-to-serial (P/S) conversion is performed. Equation 1 describes a scheme of Inverse Fourier Transform.

$$\vec{s}=[s_0, s_1, \ldots, s_{N-1}]^T=F^{-1}\vec{d} \qquad \text{[Equation 1]}$$

Here, F indicates a Fourier transform matrix. A cyclic prefix (CP) is inserted in a vector $\vec{s}$, modulated into sub-carrier frequency and then transmitted via an antenna.

A signal resulting from removing a CP from a signal received from a transmitting side by a receiving side can be represented as Equation 2.

$$\vec{r}=\vec{h}\otimes\vec{s}+\vec{w} \qquad \text{[Equation 2]}$$

In this case, $\vec{h}$ is a response vector of channel and $\vec{w}$ corresponds to reception noise. Vector $\vec{r}$ is converted to serial-to-parallel (S/P) and demodulated by FFT. A Fourier-transformed signal is represented as Equation 3.

$$\vec{v}=F\vec{r}=H\vec{d}+F\vec{w} \qquad \text{[Equation 3]}$$

In this case, if a channel is estimated, a transmission signal can be demodulated according to Equation 4.

$$\vec{d}_E=(H^HH)^{-1}H^H\vec{v} \qquad \text{[Equation 4]}$$

The processes, as shown in FIG. 1A and FIG. 1B, are adopted by most of the OFDM systems.

A multiple access structure and complexity of a PAPR enhancing method according to a related art are explained as follows.

First of all, in order to configure a multiple access structure, each user should know what kind of sub-carrier is allocated to himself. Corresponding data to be transmitted to the corresponding user is allocated to a position of the sub-carrier allocated to the corresponding user and data to be transmitted to all users gather together to form a data vector $\vec{d}$. And, by producing a time domain signal according to Equation 1 and executing Equation 4 in a receiving side, estimated values for all data should be obtained. Subsequently, each of the users undergoes a process for extracting a data value from the position of the sub-carrier allocated to the corresponding user. In this process, each of the users should go through Equation 3. So, demodulation should be always performed with complexity of $N\log_2 N$.

Schemes to enhance PAPR mostly use the expression of Equation 5.

$$\vec{d}_P=M_SM_P\vec{d} \qquad \text{[Equation 5]}$$

In this case, $M_S$ is a matrix to transform a phase component of a data vector $\vec{d}$ and $M_P$ is a permutation matrix to rearrange an order of the data vector $\vec{d}$. So, PAPR is found after $\vec{d}_P$ transformed according to Equation 5 has been converted to a time domain by Equation 1. In general, in order to make PAPR attenuate, signals in time domain are found using various combinations of $M_S$ and $M_P$ and the signal having the best performance is then searched for. So, in order to execute PAPR enhancement in frequency domain, the transform according to Equation 1 should be always used and complexity of $N\log_2 N$ is added each transform according to Equation 1.

However, in the related art OFDM system, since the complexity, which should be modulated/demodulated by each user to implement the multiple access environment, is equal to the overall OFDM symbol size regardless of the number of sub-carriers allocated to the corresponding user, lots of calculations are assigned to the corresponding user. So, more battery losses are inevitable and hardware of high performance is required.

And, in the related art OFDM system, various schemes to solve the PAPR problem depend on data manipulations in frequency domain. And, it is necessary to execute the process of checking PAPR of a real transmission signal by executing IFFT each time to check the performance after completion of the data manipulation. In doing so, a large OFDM symbol has to be modulated each time to need lots of calculations. So, more battery losses are inevitable and hardware of high performance is required as well.

DISCLOSURE OF THE INVENTION

Accordingly, the present invention is directed to an apparatus for producing/recovering OFDM/OFDMA signals and method thereof that substantially obviate one or more of the problems due to limitations and disadvantages of the related art.

An object of the present invention is to provide an apparatus for producing/recovering OFDM/OFDMA signals and method thereof, by which layered IFFT in an OFDM communications system is used.

Another object of the present invention is to provide a method and apparatus for producing OFDM signals in a transmitting side and a method and apparatus for recovering OFDM signals in a receiving side, by which a multiple access scheme for accommodating multiple users in an OFDM communication system and a reduction of power variation can be efficiently implemented.

The present invention discloses a method of producing a multi-layered OFDM symbol using a plurality of small IFFT blocks. The produced OFDM symbol is able to reduce complexity in performing IFFT or FFT while maintaining orthogonality of a related art OFDM symbol. In particular, by avoiding the related art scheme using the N-sized IFFT, the layered IFFT is executed in a manner of grouping N data symbols into P groups each of which includes Q data symbols (N=P·Q). In order to produce an OFDM signal equal to that of the related art N-sized IFFT, it is preferable that phases are aligned for the data symbols on which Q-sized IFFT has been performed. In the layered OFDM signal producing method according to the present invention, PAPR enhancement in an OFDM signal producing process, new channel generation for compatibility with such a communication system as a CDMA system and the like, insertion of data such as control data and the like, a data manipulating process for accommodation of other service models and the like can be facilitated more than those of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of producing an OFDM signal according to the present invention comprises a first step of performing IFFT (inverse fast Fourier transform) for each group of a plurality of groups, each group including a plurality of data symbols, a second step of phase shifting the IFFT-transformed symbols for each group, and a third step of performing IFFT for data symbols, wherein each data symbol is selected from each phase shifted group.

To further achieve these and other advantages and in accordance with the purpose of the present invention, an apparatus for producing an OFDM signal comprises a first IFFT module performing IFFT (inverse fast Fourier transform) for each group of a plurality of groups, each group including a plurality of data symbols, a phase shift module for phase shifting the IFFT-transformed symbols for each group, and a second IFFT module performing IFFT for data symbols, wherein each data symbol is selected from each phase shifted group.

To further achieve these and other advantages and in accordance with the purpose of the present invention, a method of recovering an OFDM signal comprises a first step of outputting each data symbol of each group one by one according to a predetermined sequence, wherein N number of data symbols received from a transmitting side are grouped into P number of groups having Q number data symbols where N=P·Q, a second step of performing P-sized FFT on P number of data symbols outputted from each group, a third step of realigning phases of the FFT-transformed data symbols in the second step, a fourth step of performing Q-sized FFT on data symbols of each group phase-realigned in the third step, and a fifth step of outputting the data symbols of each group Q-sized FFT transformed in the fourth step according to a specific sequence in serial.

To further achieve these and other advantages and in accordance with the purpose of the present invention, an apparatus for recovering an OFDM signal comprises an S/P conversion and symbol alignment module outputting each data symbol of each group one by one according to a predetermined sequence, wherein N number of data symbols received from a transmitting side are grouped into P number of groups having Q number data symbols where N=P·Q, a first FFT module performing P-sized FFT on P number of data symbols outputted from each group, a phase realigning module realigning phases of the FFT-transformed data symbols by the first FFT module, a second FFT module performing Q-sized FFT on the per group data symbols phase-realigned by the phase realigning module, and a P/S conversion and symbol alignment module outputting the data symbols of each group Q-sized FFT transformed by the second FFT module according to a specific sequence in serial.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 2:
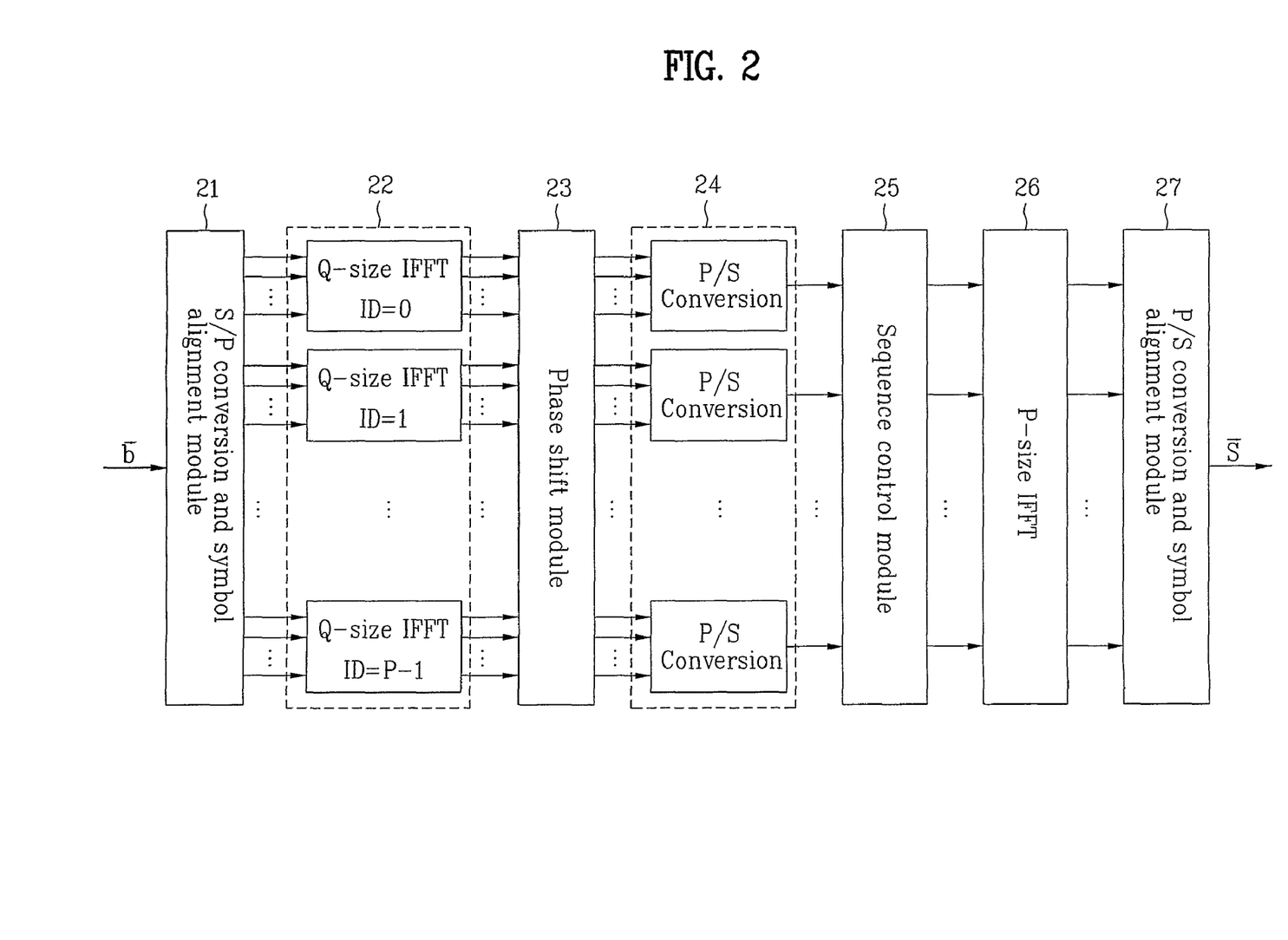
FIG. 2 is a block diagram of a transmitting side according to one preferred embodiment of the present invention.
Figure 3:
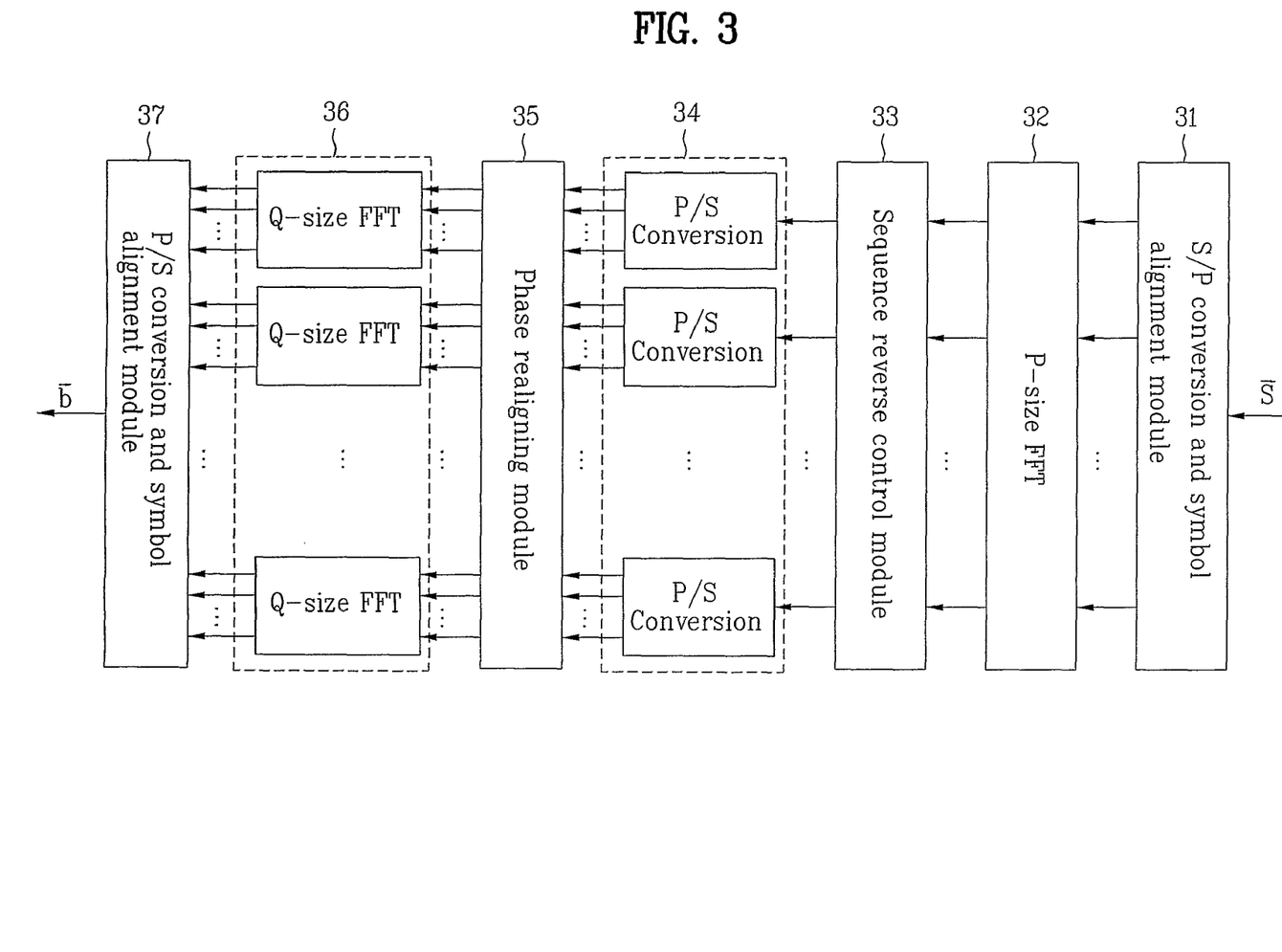
FIG. 3 is a block diagram of a receiving side according to one preferred embodiment of the present invention.

FIG. 2 is a block diagram of a transmitting side according to one preferred embodiment of the present invention, and FIG. 3 is a block diagram of a receiving side according to one preferred embodiment of the present invention.

Referring to FIG. 2, N data symbols represented as a vector $\vec{b} = \{b_0, b_1 b_2, \ldots, b_{N-1}\}$ are converted to parallel data by an S/P conversion and symbol alignment module 21 and are then aligned. The data symbol vector $\vec{b}$ has undergone digital modulation, i.e., symbol mapping by such a method as BPSK, QPSK, QAM and the like. Such a scheme as channel coding, interleaving and the like can be executed prior to the digital modulation, if necessary.

In the S/P conversion and symbol alignment module 21, grouping is performed in a manner that data symbols are grouped into P number of groups each of which includes Q number of data symbols (N=P·Q). And, symbol alignment is performed according to such a regular pattern as shown in Equation 6.

$$\vec{B}_k = \{b_k, b_{k+P}, b_{k+2P}, \ldots, b_{k+(Q-1)P}\} \quad \text{[Equation 6]}$$

In this case, $\vec{B}_k$ is a $k^{th}$ group (k=0, ..., P−1) and $b_m$ is an $m^{th}$ symbol of data vector. The per-group data vector $\vec{B}_k$ aligned according to Equation 6 goes through Q-sized IFFT by a first IFFT module 22. In this case, a basic frequency is $Pw_0$, where $w_0$ is a basic frequency used for N-sized IFFT as shown in FIG. 1A. In other words, compared to the related art shown in FIG. 1A showing that N-sized IFFT is performed on N number of data symbols, one preferred embodiment of the present invention indicates that N number of data symbols are divided into P number of groups each having Q number of data symbols and that Q-sized IFFT is performed on each of the groups. In this case, a basic frequency is always $Pw_0$ for the IFFT performed on each of the groups.

The phase shift module 23 performs phase shift on the per-group symbols IFFT-transformed by the first IFFT module 22. The phase shift is performed on the per-group symbols to compensate for the basic frequency set to $Pw_0$ for each of the groups in performing IFFT. Accordingly, a necessary phase shift is performed to make a finally produced OFDM signal match an OFDM symbol produced according to FIG. 2. And, a phase vector to be multiplied by a Q-sized IFFT output for each data symbol group can be represented as Equation 7.

$$\vec{D}_k = W(k)\vec{C}_k \quad \text{[Equation 7]}$$

In Equation 7, $\vec{C}_k$ is a $k^{th}$ group vector IFFT output, $\vec{D}_k$ is a result vector of phase shift, and W(k) is a phase shift matrix. The phase shift matrix can be represented as Equation 8.

$$W(k) = \begin{bmatrix} 1 & 0 & \cdots & 0 \\ 0 & \exp(jkw_0) & \cdots & 0 \\ \vdots & \vdots & \ddots & \vdots \\ 0 & 0 & \cdots & \exp(j(Q-1)kw_0) \end{bmatrix} \quad \text{[Equation 8]}$$

A P/S converting module 24 performs parallel-to-serial conversion on each group including the data symbols phase-shifted by the phase shift module 23. Each of the parallel-to-serial converted groups becomes Q number of serial vector matrixes. And, total P number of serial vector matrixes is generated.

A sequence control module 25 performs data manipulation according to system requirements. For instance, the sequence control module 25 can be configured to accommodate a coding scheme for PAPR reduction, new channel generation for compatibility with such a communication system as a CDMA system and the like, data insertion of control data and the like and other service models together. An example of the data manipulation for the PAPR reduction is explained as follows.

As mentioned in the foregoing description, in the PAPR enhancement scheme, $\vec{d}_P$ transformed according to Equation 5 is converted to a time domain by IFFT and PAPR is then found. To attenuate PAPR, all signals in the time domain are found using various combinations of $M_S$ and $M_P$. And, the signal having the best performance is then searched for among the found signals. So, in the related art, to perform the PAPR enhancement in frequency domain, N-sized IFFT should be used to find the PAPR for various combinations of $M_S$ and $M_P$. And, complexity of $N\log_2 N$ is added each time. Yet, in case that the PAPR enhancement scheme is performed through the sequence control module 25 according to one preferred embodiment of the present invention, it is enough to use P-sized IFFT for IFFT to find PAPR. So, it is able to reduce the complexity smaller than that of the related art.

Differing from the performance enhancement method through time domain conversion after data conversion in frequency domain, PTS (partial transmit sequence) scheme is able to directly enhance PAPR in time domain.

In the PTS scheme, data symbols are grouped into predetermined number of groups and time domain conversion is performed for each of the groups without converting data symbols in frequency domain. Subsequently, before adding the converted symbols in time domain into one, different phase patterns are applied to the symbols, respectively to be added together. The data symbols grouped into the groups configure several vectors as shown in Equation 9.

$$\vec{d} = \vec{d}_1 + \vec{d}_2 + \ldots + \vec{d}_G \quad \text{[Equation 9]}$$

In Equation 9, G is an integer by which a total number N of data symbols is divided. A per-group data vector $\vec{d}_k$ (k=1, ..., G) is given by Equation 10.

$$\vec{d}_k = \{0_{1 \times (k-1)N/G}, d_{1+(k-1)N/G}, d_{2+(k-1)N/G}, \ldots, d_{N/G+(k-1)N/G}, 0_{1 \times (N-k)N/G}\} \quad \text{[Equation 10]}$$

The per-group data vector is transformed into time domain by IFFT to produce signal $\vec{S}_k$ (k=1, ..., G). Various signals are produced by varying phase components that are multiplied based on the signal produced by IFFT. The signal having a smallest PAPR is selected from the various signals and the selected signal is then transmitted. And, this process can be represented by Equation 11.

$$\vec{s} = \sum_{k=1}^{G} \exp(j\theta_k)\vec{s}_k \qquad \text{[Equation 11]}$$

In this case, $\theta_k$ is selected from preset values as phase components to enhance PAPR.

Thus, domain transform of signal is performed in the early stage and is then represented as a simple sum in time domain. So, the PTS scheme is advantageous in that calculation complexity due to domain transform is lowered.

The above-explained PTS scheme to enhance PAPR is applicable to one preferred embodiment of the present invention shown in FIG. 3. Namely, after phase shift has been performed by the phase shift module 23, various symbols are produced in a manner of multiplying per-group symbols, which have been parallel-to-serial (P/S) converted per group by the P/S converting module 24, by various phase components that are varied. A signal having a smallest PAPR is selected from the various signals and is then outputted.

Meanwhile, instead of multiplying the phase component, the PTS scheme brings the same effect of multiplying the phase component by circularly shifting each symbol. For instance, by circularly shifting a vector $\vec{S}_k = [S_k^0, S_k^1, \ldots, S_k^{N-1}]$ by $C_k$, a vector shown in Equation 12 is formed. Consequently, it brings the same effect of multiplying the vector $\vec{S}_k$ by the phase component.

$$S_k^{C_k} = [S_k^{N-C_k+1}, \ldots S_k^{N-1} S_k^0, S_k^1, \ldots, S_k^{N-C_k-1}] \qquad \text{[Equation 12]}$$

For actual implementation, the circular shift of data vector can be actually performed by a process of storing the data vector in a memory and outputting it in different order. So, the same performance can be obtained without executing such a calculation of multiplying the phase component.

Assuming that a per-group signal vector through the data manipulation by the sequence control module 25 is $\vec{X}_k$, if a vector is generated by collecting P vectors at the same positions, respectively, it can be represented as Equation 13.

$$\vec{E}_k = \begin{bmatrix} \vec{X}_0(k) \\ \vec{X}_1(k) \\ \vdots \\ \vec{X}_{P-1}(k) \end{bmatrix} \qquad \text{[Equation 13]}$$

A second IFFT module 26 performs P-sized IFFT on each vector $\vec{E}_k$. In this case, a basic frequency of the second IFFT module 26 is $Qw_0$. Namely, each symbol per group through data manipulation by the sequence control module 25 configures the vector $\vec{E}_k$ and is then IFFT-transformed by the second IFFT module 26. Since the number of data symbols of each group is Q, the second IFFT module 26 performs the IFFT Q-times.

A P/S conversion and symbol alignment module 27 performs parallel-to-serial (P/S) conversion on the symbols IFFT-transformed by the second IFFT module 26 and then realigns the corresponding sequence. In the sequence alignment, a sequence of vectors in IFFT-transforming each vector $\vec{E}_k$ by the second IFFT module 26 is decided by Equation 14.

$$I_k = [k, k+Q, \ldots, k+(P-1)Q] \qquad \text{[Equation 14]}$$

Hence, an IFFT output $\vec{F}_k$ of $\vec{E}_k$ by the second IFFT module 26 is aligned on a time axis according to the sequence shown by Equation 11. After P-sized IFFT has been performed Q-times, a final signal has the same value and structure of the OFDM signal $\vec{s}$ in FIG. 1A. Preferably, a cyclic prefix is attached before the final signal is transmitted on a channel.

FIG. 3 is a block diagram of a receiving side according to one preferred embodiment of the present invention, by which the OFDM signal produced by the data processing of the transmitting side shown in FIG. 2 is recovered.

Referring to FIG. 3, an apparatus for recovering OFDM signals according to one preferred embodiment of the present invention includes an S/P conversion and symbol alignment module 31 outputting one data symbol per a group according to a predetermined sequence by grouping N number of data symbols received from a transmitting side into P number of groups each having Q number of data symbols (N=P·Q), a first FFT module 32 performing P-sized FFT on the P number of data symbols outputted one by one per the group, a sequence reverse control module 33 manipulating the per-group data symbols FFT transformed by the first FFT module 32 for data symbol recovery according to PAPR control information transmitted from the transmitting side, a serial-to-parallel converting module 34 serial-to-parallel converting an output of the sequence reverse control module 33, a phase realigning module 35 realigning phases of the per-group data symbols, a second FFT module 36 performing Q-sized FFT on the per group data symbols phase realigned by the phase realigning module 35, and a P/S conversion and symbol alignment module 37 outputting the per-group data symbols Q-sized FFR transformed by the second FFT module 36 according to a specific sequence in series.

A data processing process in the receiving side shown in FIG. 3 is executed in a sequence reverse to that of the data processing process in the transmitting side shown in FIG. 2. In particular, IFFT by the transmitting side corresponds to the FFT and a reverse phase shift in the phase reverse shift module is performed by multiplying a conjugate of Equation 8. Data symbol alignment and grouping release are carried out in manners reverse to those of Equation 14 and Equation 6. In FIG. 2, it is possible for the P/S conversion and symbol alignment module 27 to transmit the inputted signal with parallel-to-serial conversion without the symbol alignment according to Equation 11. For this, in FIG. 3, the received signal is serial-to-parallel converted and is then delivered to a next end. The data processing in the receiving side corresponds to that in the transmitting side, of which detailed explanation is omitted in the following description.

Accordingly, the present invention provides the following effects or advantages.

First of all, since each user in a multiple access environment is enough to carry out a demodulation operation on a group allocated to itself only, it is able to find out data of a channel assigned to itself with small quantity of operation.

Secondly, when various schemes are used as schemes to solve PAPR causing performance degradation in an OFDM system, the same effect can be brought with fewer calculations.

Figure 4:
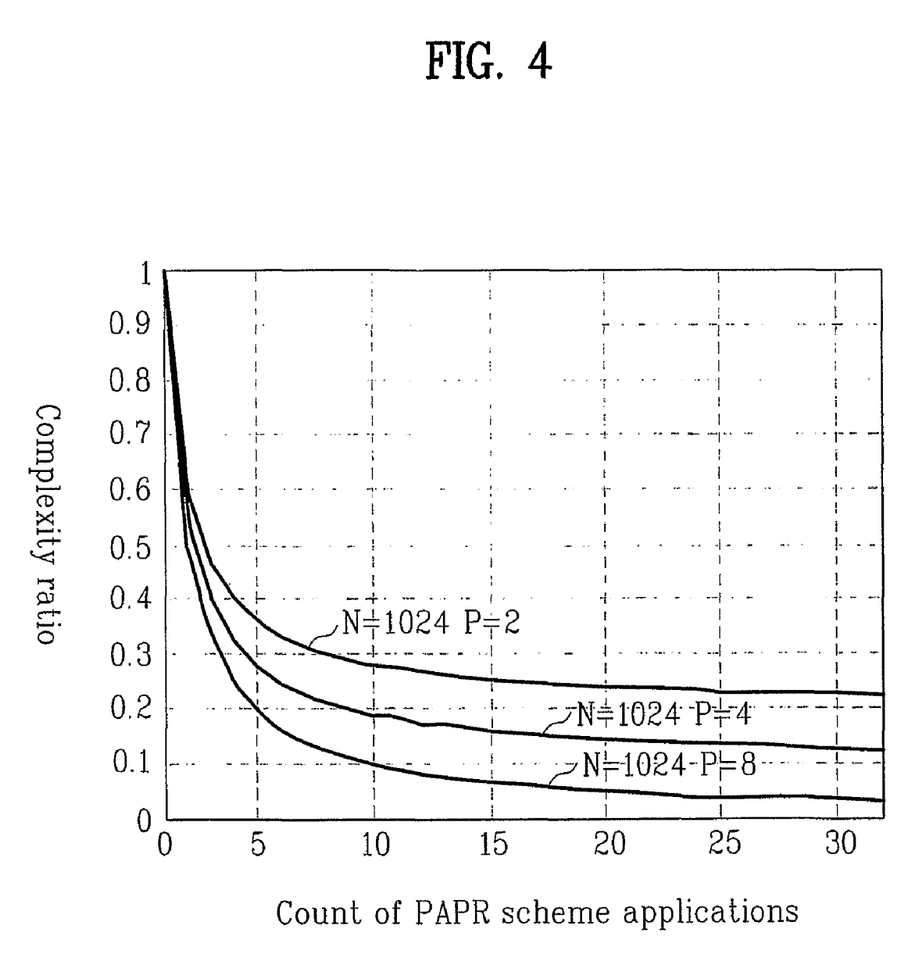
FIG. 4 and FIG. 5 are graphs of simulation results to explain effects of the present invention.
Figure 5:
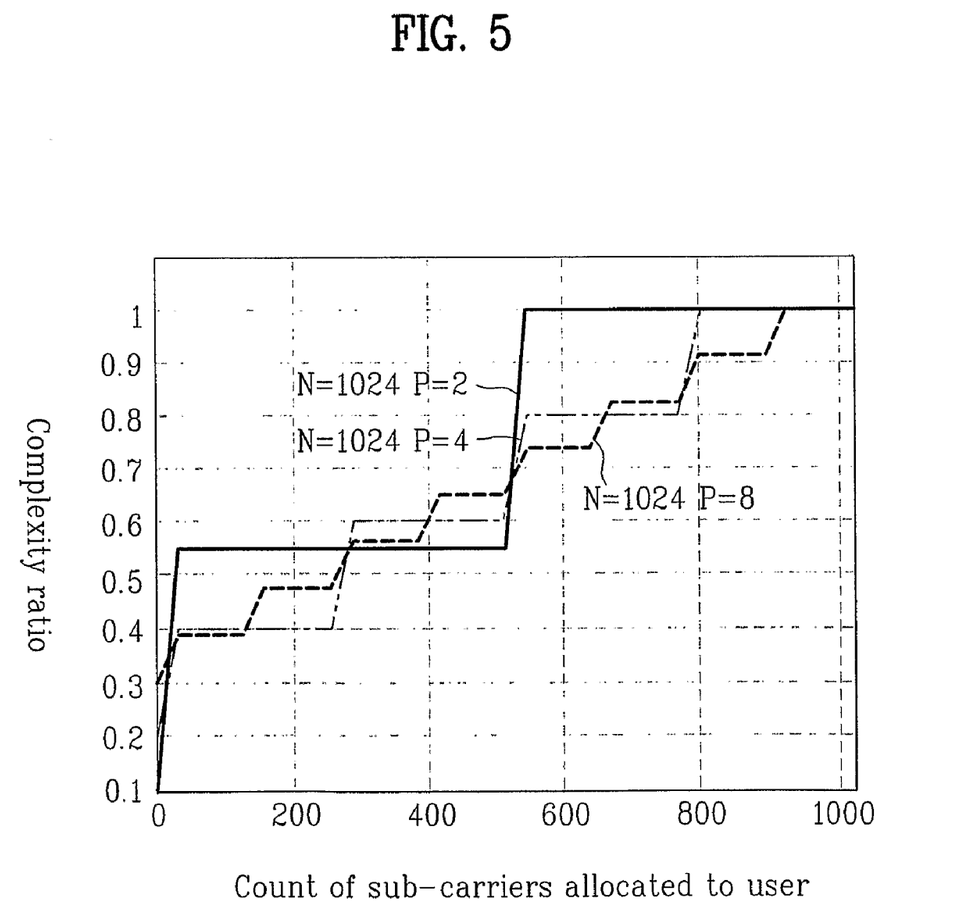

Thirdly, various services can be inserted via a sequence control module in the middle step of symbol generation FIG. 4 and FIG. 5 are graphs of simulation results to explain effects of the present invention.

Referring to FIG. 4, a horizontal axis indicates a count of applying PAPR scheme to obtain optimal PAPR, while a vertical axis indicates a complexity ratio of layered OFDM to conventional OFDM. A simulation is carried out by keeping a size (N) of an input data symbol uniformly and varying a size (P) of a data symbol group. As a result of the simulation, complexity of the OFDM producing method according to the present invention becomes lower than that of the related art method if the P is reduced or the count of the PARR scheme applications is raised.

FIG. 5 shows a simulation result associated with a complexity ratio of layered OFDM to conventional OFDM according to a count of sub-carriers allocated to each user in a receiving side. In the related art, a simulation is performed on the assumption that entire sub-carriers are allocated to one user. As can be seen through FIG. 5, if the count of sub-carriers allocated to each user gets smaller, the complexity of the OFDM signal producing method according to the present invention becomes lower than that of the related art method.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the technical features of the present invention are applicable to communication systems adopting OFDM or OFDMA.

The invention claimed is:

1. A method of producing an OFDM signal in a communication system, the method comprising:
grouping N data symbols to be transmitted into P number of groups, each of the P groups including Q number of data symbols, wherein N, P and Q are integers greater than 1 and N=P*Q;
performing P number of Q-size IFFTs (inverse fast Fourier transform) on each of the P groups of Q data symbols in parallel;
phase shifting the IFFT-transformed P groups of Q data symbols, wherein the phase shifting is performed per group;
performing parallel-to-serial conversion on each of the P groups of Q data symbols; and
performing a P-size IFFT on the parallel-to-serial converted data symbols, wherein the P-size IFFT is performed Q times.

2. The method of claim 1, wherein if the input data symbols which are grouped into the P groups of Q data symbols are represented as data symbol vector $\vec{b}=\{b_0, b_1, b_2, \ldots, b_{N-1}\}$, a $k^{th}$ group $\vec{B}_k=\{b_k, b_{k+P}, b_{k+2P}, \ldots, b_{k+(Q-1)P}\}$, where $k=0, \ldots, P-1$ and $b_m$ is an $m^{th}$ symbol of the data symbol vector.

3. The method of claim 2, wherein in-performing the Q-size IFFT comprises using $Pw_0$ as a basic frequency for the Q-size IFFT, where $w_0$ is a basic frequency used for N-size IFFT and N=P·Q.

4. The method of claim 3, further comprising:
aligning the IFFT-completed data symbols resulting from the P-size IFFT according to a sequence of the input data symbols $\vec{b}=\{b_0, b_1, b_2, \ldots, b_{N-1}\}$.

5. The method of claim 3, wherein performing the P-size IFFT comprises using $Qw_0$ as a basic frequency for the P-size IFFT.

6. The method of claim 1, further comprising:
adjusting a PAPR (peak power to average power ratio) using the phase shifted data symbols per group.

7. The method of claim 6, wherein the PAPR is adjusted by a PTS (partial transmit sequence) scheme.

8. The method of claim 7, wherein adjusting the PAPR by the PTS scheme comprises circular shifting the phase shifted data symbols of each group to adjust a phase of each group.

9. An apparatus for producing an OFDM signal in a communication system, the apparatus comprising:
a grouping module configured to group N data symbols to be transmitted into P number of groups, each of the P groups including Q number of data symbols, wherein N, P and Q are integers greater than 1 and N=P*Q;
a first IFFT module configured to perform P number of Q-size IFFTs (inverse fast Fourier transform) on each of the P groups of Q data symbols in parallel;
a phase shift module configured to phase shift the IFFT-transformed P groups of Q data symbols, wherein the phase shifting is performed per group;
a parallel-to-serial conversion module configured to perform parallel-to-serial conversion on each of the P groups of Q data symbols; and a second IFFT module configured to perform a P-size IFFT on the parallel-to-serial converted data symbols, and transmit the data symbols on which the P-size IFFT was performed to a receiving side, wherein the P-size IFFT is performed Q times.

10. The apparatus of claim 9, wherein if the input data symbols which are grouped into the P groups of Q data symbols are represented as data symbol vector $\vec{b}=\{b_0, b_1, b_2, \ldots, b_{N-1}\}$, a $k^{th}$ group $\vec{B}_k=\{b_k, b_{k-P}, b_{k+2P}, \ldots, b_{k+(Q-1)P}\}$, where $k=0, \ldots, P-1$ and $b_m$ is an $m^{th}$ symbol of the data symbol vector.

11. The apparatus of claim 10, wherein the first IFFT module comprises P number of Q-size IFFT modules, each of which is configured to perform a Q-size IFFT.

12. The apparatus of claim 10, wherein the first IFFT module uses $Pw_0$ as a basic frequency for performing the Q-size IFFT, where $w_0$ is a basic frequency used N-size IFFT where N=P·Q.

13. The apparatus of claim 12, further comprising:
an S/P conversion and symbol alignment module configured to align the IFFT-completed data symbols from the second IFFT module according to a sequence of the input data symbols $\vec{b}=\{b_0, b_1, b_2, \ldots, b_{N-1}\}$.

14. The apparatus of claim 12, wherein the second IFFT module is further configured to use $Qw_0$ as a basic frequency for performing the P-size IFFT.

15. The apparatus of claim 9, further comprising:
a sequence control module configured to adjust a PAPR (peak power to average power ratio) using the phase shifted data symbols per group.

16. The apparatus of claim 15, wherein the sequence control module is further configured to adjust the PAPR by a PTS (partial transmit sequence) scheme.

17. The apparatus of claim 16, wherein adjusting the PAPR by the PTS scheme comprises circular shifting the phase shifted data symbols of each group to adjust a phase of each group.

18. A method of recovering an OFDM signal, the method comprising:
grouping N data symbols received from a transmitting side into P groups of Q data symbols, wherein N, P and Q are integers greater than 1 and N=P*Q;

outputting one data symbol per group one-by-one according to a predetermined sequence;
performing a P-size fast Fourier transform (FFT) on P data symbols respectively output from the P groups, wherein the P-size FFT is performed Q times;
performing serial-to-parallel conversion on the P-size FFT-transformed data symbols;
realigning phases of the serial-to-parallel converted data symbols;
performing P number of Q-size FFTs on P groups of the phase realigned data symbols in parallel; and
serially outputting the Q-size FFT-transformed data symbols of each of the P groups according to a specific sequence.

19. The method of claim 18, further comprising:
manipulating the P-size FFT-transformed data symbols for a data symbol recovery according to peak power to average power ratio (PAPR) control information transmitted from the transmitting side after performing the P-size FFT.

20. An apparatus for recovering an OFDM signal, the apparatus comprising:
an S/P conversion and symbol alignment module configured to group N data symbols received from a transmitting side into P groups of Q data symbols and output one data symbol per group one-by-one according to a predetermined sequence, wherein N, P and Q are integers greater than 1 and N=P*Q;
a first FFT module configured to perform P-size fast Fourier transform (FFT) on P data symbols respectively output from the P groups, wherein the P-size FFT is performed Q times;
a serial-to-parallel conversion module configured to perform serial-to-parallel conversion on the P-size FFT-transformed data symbols;
a phase realigning module configured to realign phases of the serial-to-parallel converted;
a second FFT module configured to perform P number of Q-size FFTs on P number of the phase realigned Q data symbols; and
a P/S conversion and symbol alignment module configured to serially output the Q-size FFT transformed data symbols of each of the P groups according to a specific sequence.

21. The apparatus of claim 20, further comprising:
a sequence reverse control module configured to manipulate the P-size FFT-transformed data symbols for a data symbol recovery according to peak power to average power ration (PAPR) control information transmitted from the transmitting side.

* * * * *